March 20, 1928.
E. F. PIERCE
1,663,485
LIQUID LEVEL GAUGE
Filed Jan. 15, 1926
2 Sheets-Sheet 1
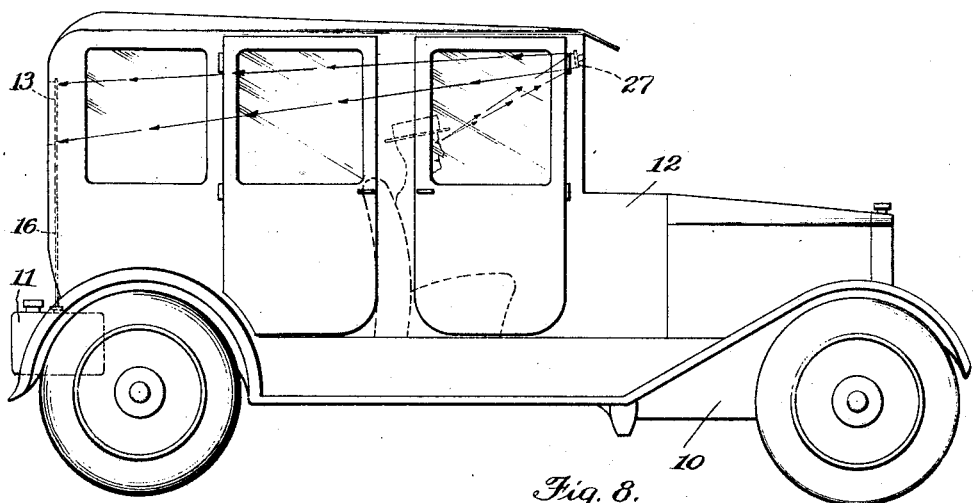
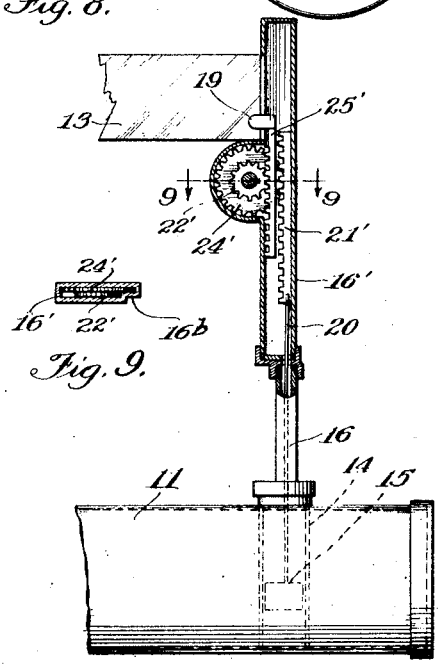
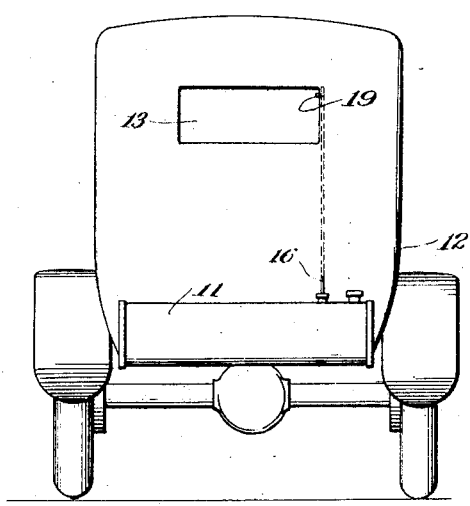
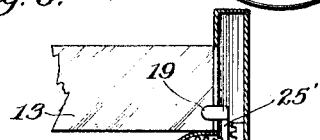
Inventor
Earl F. Pierce.
By Pierce & Suret
Attys.

March 20, 1928. 1,663,485
E. F. PIERCE
LIQUID LEVEL GAUGE
Filed Jan. 15, 1926   2 Sheets-Sheet 2
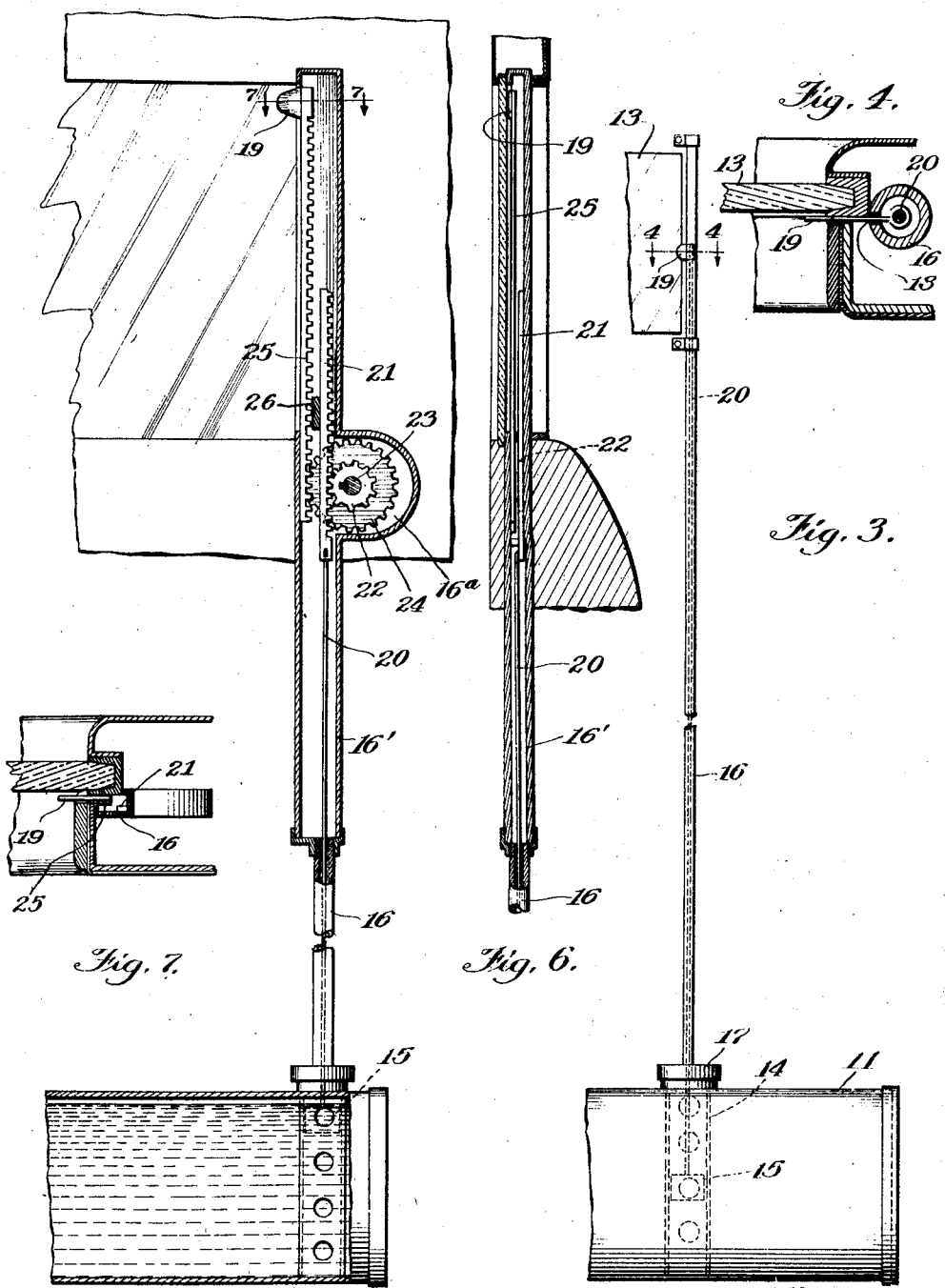

Patented Mar. 20, 1928.

1,663,485

UNITED STATES PATENT OFFICE.

EARL F. PIERCE, OF WINNETKA, ILLINOIS; CENTRAL TRUST COMPANY OF ILLINOIS, ADMINISTRATOR OF SAID EARL F. PIERCE, DECEASED, ASSIGNOR TO FLORENCE E. PIERCE.

LIQUID-LEVEL GAUGE.

Application filed January 15, 1926. Serial No. 81,451.

My invention relates to improvements in gauges, and is particularly concerned with a novel type of gauge for indicating to the driver of an automotive vehicle the level of the fuel in the fuel tank in those vehicles in which the fuel tank is located to the rear of the driver's seat.

The objects of my present invention are:

First, to provide a fuel gauge for an automobile in which the fuel tank is located adjacent the rear end of the chassis, that can be readily observed by the driver;

Second, to provide a fuel gauge of the character described that can also be readily observed by an attendant filling the fuel tank;

Third, to provide a gauge such as described, in which the movement of a float in the fuel tank is communicated to an indicator by positive driving connections but in which the friction of the moving parts is reduced to a minimum, thereby permitting the use of a comparatively small float in the fuel tank and doing away with the necessity of providing power multiplying means between the float and the indicating means, although if desired, such power multiplying means may be employed; and Fourth, to provide a gauge such as described, that is simple in construction, economical to manufacture and not liable to get out of order.

Other objects of my invention will appear as this description proceeds, reference being had to the accompanying drawings, in which Figure 1 is a side elevation of an automobile embodying my invention;

Figure 2 is a rear end elevation of the automobile shown in Figure 1;

Figure 3 is an elevation of the gauge mechanism, the body of the vehicle being broken away more clearly to disclose the construction of the gauge;

Figure 4 is a transverse section taken on line 4—4 of Figure 3;

Figure 5 is a vertical section partially in elevation, showing a modified form of my invention, wherein the indicator travels vertically across one end of the window, the height of which is greater than the depth of the fuel tank;

Figure 6 is a section taken at right angles to the view in Figure 5, the fuel tank and adjacent portion of the vertical tube omitted;

Figure 7 is a sectional detail taken on line 7—7 of Figure 5;

Figure 8 is a view similar to Figure 5, but showing a modified form of my invention, in which the height of the rear window is less than the depth of the fuel tank; and Figure 9 is a transverse section taken on line 9—9 of Figure 8.

Throughout the several figures of the drawings, similar reference characters are used for referring to similar parts.

Referring for the time being to Figures 1, 2, 3 and 4 of the drawings, wherein I have illustrated the simplest embodiment of my invention, I have disclosed an automobile of conventional design comprising a chassis 10 having a fuel tank 11 adjacent the rear end thereof, and supporting the body 12 having at the rear end thereof the usual window 13. As shown in the drawings, this window is rectangular in outline. In this form of my invention as well as the remaining forms, a still-well 14 consisting of a perforated tube is inserted through the top of the tank and extends to a point adjacent the bottom thereof. A float 15, of any desired construction, is mounted to move up and down in the tube, or still-well 14, with the level of the fuel in the tank 11. A tube 16 is connected with the cap 17 at the upper end of the tube 14 and extends upwardly along one of the vertical edges of the rear window 13. The upper end of the tube is slotted on the side adjacent the window 13 as shown at 18, to provide a guide for the indicator 19. This indicator is carried by the upper end of a wire, or small rod 20, which extends down through the tube 16, and the lower end of which is connected in any suitable manner with the float 15.

From an inspection of Figures 1 and 2, it will be seen that practically all the parts of the gauge just described, move in the same straight line so that there is no tendency for the wire, or rod 20, to bind upon any portion of the guide tube 16. This insures, first, that a comparatively small float 15 may be used inasmuch as its only function is to carry the rod 20 and the indicator 19, and position these elements according to the level of the fuel in the tank 11; second, since there is practically no friction between the moving parts and the stationary parts, the gauge should be quite accurate; and third, the construction can be very cheap.

It should be understood that while I have illustrated an embodiment of my invention in which the float rod and indicator all move in substantially the same straight line, that my invention is not limited to such a construction, because more or less curvature could be placed in the tube 16 and the rod 20 without causing any serious amount of friction between the moving and the stationary parts.

In the modification just described, the height of the window 13 is substantially equal to the depth of the tank 11, and the entire height of the window may be used to provide a scale for the indicator. Suitable indicia for co-acting with the indicator may be placed upon the window glass itself, if desired. With such a relation between the height of the window and the depth of the tank, no means are required for modifying the movement of the indicator, but in the construction such as shown in Figure 5, in which the height of the window is greater than the depth of the tank, some means must be employed for modifying the movement of the indicator relative to the movement of the float if it is desired to make use of the entire height of the window.

In this embodiment of my invention, the rod 20 is shortened and has attached to its upper end, a rack 21 that meshes with the spur gear 22, and this gear is keyed upon a short shaft 23 upon which is also keyed a gear 24 of larger diameter. A second rack 25 meshes with the gear 24 and carries the indicator 19 at its upper end.

In this form of my invention, the guide tube is divided into two parts 16 and 16'; the last mentioned part being larger in cross section and substantially rectangular in cross section. Adjacent its central portion, the part 16' is provided with a lateral extension, or enlargement 16ᵃ for housing the two gears 22 and 24, and for providing bearings for the end of the shaft 23. For holding the two racks 21 and 25 in their proper positions and guiding them in their movements, an elongated lug 26 may be struck up from the far side of the guide tube 16', as shown in Figure 5, and positioned between the two racks, as shown therein.

It will be noted that the two racks 21 and 25 engage with the gears 22 and 24, respectively, upon the same side of the axis about which the gears rotate, so that the indicator 19 will move in the same direction as the float 15. If for any reason it be desired to have the indicator 19 move in a direction opposite to the direction of the movement of the float 15, this can be accomplished by making the racks 21 and 25 engage with the gears 22 and 24, respectively, upon opposite sides of the shaft 23.

In Figures 8 and 9, I have disclosed a modified form of my invention similar to that shown in Figures 5, 6 and 7, but in which the height of the window 13 is less than the depth of the tank 11. In order to cause the indicator 19 to move proportionately to the movement of the float 15, but at the same time accommodate itself to the height of the window 13, the rack 21' connected with the upper end of the rod 20, engages with the large gear 24', and the rack 25' carrying the indicator 19 engages with the smaller gear 22' so that the movement of the indicator 19 will be smaller than any given movement of the float 15, but nevertheless proportional thereto. In this form of my invention, in place of making use of a lug 26 to guide the two racks and hold them in place, a portion of the guide tube 16' may be indented, as shown at 16ᵇ so as to hold both racks in engagement with the respective gears.

The several gauges described above disclose modified forms of the gauges described and claimed in my co-pending applications, Serial No. 737,294 filed September 12, 1924, and Serial No. 58,856 filed September 26, 1925, respectively, in which it is pointed out that by silhouetting the indicator 19 against the rear window, the driver sitting in the front seat may either turn his head to ascertain the position of the indicator 19, or may observe its position by looking into a rear vision mirror 27, and it is intended that the gauges described herein be used in a similar manner. It will, of course, be apparent that an attendant filling the fuel tank can easily observe the position of the indicator 19, thereby enabling him properly to fill the fuel tank.

While I have described the details of the construction of the preferred embodiment of my invention, it is to be clearly understood that my invention is not limited to these details, but is capable of other modifications and adaptations within the scope of the appended claims.

Having thus described my invention, what I claim is:

1. The combination with an automobile comprising a chassis, a fuel tank mounted on said chassis adjacent the rear end thereof, a body mounted on said chassis and having a window at the rear end thereof, and means for indicating the level of fuel in said fuel tank comprising an indicator, a guide for confining the movement of said indicator to a path along one of the vertical edges of said window, a float in said tank, and means for connecting said indicator and float so that said indicator moves proportionately to the movement of said float comprising a rack secured to said indicator, a second rack connected with said float, and a gear train connecting said racks, the gear meshing with one of said racks being of smaller diameter than the gear meshing with the other of said racks.

2. The combination with an automobile comprising a chassis, a fuel tank mounted on said chassis adjacent the rear end thereof, a body mounted on said chassis and having a window at the rear end thereof, and means for indicating the level of fuel in said fuel tank comprising an indicator, a guide for confining the movement of said indicator to a path along one of the vertical edges of said window, a float in said tank, and means for connecting said indicator and float so that said indicator moves proportionately to the movement of said float comprising a rack secured to said indicator, a second rack connected with said float, and two gears for connecting said racks, said gears having a common axis and connected to rotate together, one of said gears having a larger diameter than the other, said racks engaging with said gears on the same side of the axis of said gears.

3. The combination with an automobile comprising a chassis, a fuel tank mounted on said chassis adjacent the rear end thereof, a body mounted on said chassis and having a window at the rear end thereof, and means for indicating the level of fuel in said fuel tank comprising an indicator, a guide for confining the movement of said indicator to a path along one of the vertical edges of said window, a float in said tank, and means for connecting said indicator and float so that said indicator moves proportionately to the movement of said float comprising a rack secured to said indicator, a second rack connected with said float, and gear mechanism connecting said racks.

4. The combination with an automobile comprising a chassis, a fuel tank mounted on said chassis adjacent the rear end thereof, a body mounted on said chassis and having a window at the rear end thereof, and means for indicating the level of fuel in said fuel tank comprising an indicator, a guide for confining the movement of said indicator to a path along one of the vertical edges of said window, a float in said tank, and means for connecting said indicator and float so that said indicator moves proportionately to the movement of said float.

5. The combination with an automobile having a chassis, a fuel tank supported adjacent the rear end of said chassis, a body mounted on said chassis and having a window adjacent its rear end, an indicator mounted to move adjacent one vertical edge of said window, the height of said window and the depth of said tank being different, a float in said tank, and means for connecting said indicator and float so that said indicator will move over said window a distance different from but proportional to the movement of said float.

6. The combination with an automobile comprising a chassis, a fuel tank mounted on said chassis, a body on said chassis, said body having a window, an indicator movable adjacent one of the vertical edges of said window and substantially parallel therewith, a float in said tank, and means, including a rod, for connecting said indicator and float.

7. The combination with an automobile having a chassis, a fuel tank supported adjacent the rear end of said chassis, a body mounted on said chassis and having a window adjacent its rear end, a rear view mirror in front of the driver's seat by means of which the driver may see the window, an indicator mounted to move adjacent one vertical edge of said window, a float in said tank, and means for connecting said indicator and float so that the indicator will move over said window a distance proportional to the movement of the float and be visible to the driver through said rear view mirror.

In witness whereof, I hereunto subscribe my name this 12th day of January, 1926.

EARL F. PIERCE.